United States Patent
Miloslavsky

[11] Patent Number: 6,130,933
[45] Date of Patent: *Oct. 10, 2000

[54] APPARATUS AND METHODS FOR COORDINATING TELEPHONE AND DATA COMMUNICATIONS

[75] Inventor: Alec Miloslavsky, San Carlos, Calif.

[73] Assignee: Genesys Telecommunications Laboratories, Inc., San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/594,628

[22] Filed: Feb. 2, 1996

[51] Int. Cl.⁷ .................................................. H04M 11/00

[52] U.S. Cl. ........................................ 379/90.01; 379/93.14; 379/265; 379/93.23; 379/93.24; 370/352

[58] Field of Search ................................... 379/96, 97, 98, 379/93, 90, 94, 265, 142, 93.09, 90.01, 93.07, 93.12, 93.14, 93.17, 93.23, 93.25, 93.24, 267; 395/793, 200.1, 200.02, 200.2; 370/401, 352

[56] References Cited

U.S. PATENT DOCUMENTS

| | | | |
|---|---|---|---|
| 4,290,141 | 9/1981 | Anderson et al. | 455/2 |
| 4,320,256 | 3/1982 | Freeman | 179/6.04 |
| 4,345,315 | 8/1982 | Cadotte | 364/900 |
| 4,355,207 | 10/1982 | Curtin | 179/18 |
| 4,355,372 | 10/1982 | Tarshis et al. | 364/900 |
| 4,439,636 | 3/1984 | Newkirk et al. | 179/7.1 |
| 4,451,700 | 5/1984 | Elder et al. | 179/2 |
| 4,489,438 | 12/1984 | Hughes | 381/51 |
| 4,517,410 | 5/1985 | Carley et al. | 179/6.04 |
| 4,521,643 | 6/1985 | Dupuis et al. | 179/2 |
| 4,523,055 | 6/1985 | Hohl et al. | 179/2 |
| 4,528,643 | 7/1985 | Freeny, Jr. | 364/900 |
| 4,539,435 | 9/1985 | Eckmann | 179/2 |
| 4,559,415 | 12/1985 | Bernard et al. | 179/2 |
| 4,566,030 | 1/1986 | Nickerson et al. | 358/84 |
| 4,577,062 | 3/1986 | Hilleary et al. | 179/2 |
| 4,577,067 | 3/1986 | Paul et al. | 179/99 |
| 4,578,700 | 3/1986 | Shrier et al. | 358/84 |
| 4,580,012 | 4/1986 | Matthews et al. | 179/18 |
| 4,584,602 | 4/1986 | Nakagawa | 358/84 |
| 4,587,379 | 5/1986 | Masuda | 179/2 |
| 4,598,367 | 7/1986 | Defrancesco et al. | 364/408 |
| 4,603,232 | 7/1986 | Shababb | 179/2 |
| 4,611,094 | 9/1986 | Gawrys et al. | 179/7.1 |
| 4,625,276 | 11/1986 | Benton et al. | 364/408 |
| 4,630,200 | 12/1986 | Tateisi et al. | 364/405 |
| 4,630,201 | 12/1986 | White | 364/408 |
| 4,634,809 | 1/1987 | Trok et al. | 379/91 |

(List continued on next page.)

*Primary Examiner*—Stella Woo
*Attorney, Agent, or Firm*—Donald R. Boys; Central Coast Patent Agency

[57] ABSTRACT

A telephony call center system comprises an Internet connection adapted for receiving data from a WEB server, the data originating from the computer platform of a person browsing the Internet, including data identifying the browsing person, such as a telephone number, and indicating to the WEB server a desire of the browsing person to communicate with an agent at the call center. The communication desired may be (a) a request for an agent at the call center to receive a telephone call from a browsing person, or (b) a request for a call to be placed to the browsing person from the call center. In both (a) and (b) the practical result is a telephone conference between the browsing person and an agent at the call center. In the first instance (a), in response to the data from the WEB server to the call center, the call center provides to the WEB server, for transfer to the browsing person via the Internet, a telephone number of a routing point at the call center. The call center selects an agent and initiates a watch for an arriving call from the browsing person. On arrival of the call, it is switched to the selected agent. In the other instance (b), in response to the data, the call center enters the browsing person's telephone number to a dialer and, when the dialer completes a call to the browsing person, switches the call to a selected agent.

5 Claims, 5 Drawing Sheets

U.S. PATENT DOCUMENTS

| | | | |
|---|---|---|---|
| 4,649,563 | 3/1987 | Riskin | 379/97 |
| 4,654,482 | 3/1987 | Deangelis | 379/95 |
| 4,667,287 | 5/1987 | Allen et al. | 364/200 |
| 4,674,044 | 6/1987 | Kalmus et al. | 364/408 |
| 4,696,029 | 9/1987 | Cohen | 379/92 |
| 4,697,282 | 9/1987 | Winter et al. | 379/67 |
| 4,756,020 | 7/1988 | Fondale | 379/112 |
| 4,757,267 | 7/1988 | Riskin | 379/113 |
| 4,763,191 | 8/1988 | Gordon et al. | 358/86 |
| 4,785,408 | 11/1988 | Britton et al. | 364/513.5 |
| 4,788,715 | 11/1988 | Lee | 379/84 |
| 4,812,843 | 3/1989 | Champion, III et al. | 340/905 |
| 4,866,756 | 9/1989 | Crane et al. | 379/88 |
| 4,893,328 | 1/1990 | Peacock | 379/67 |
| 4,896,345 | 1/1990 | Thorne | 379/67 |
| 4,908,850 | 3/1990 | Masson et al. | 379/88 |
| 4,953,204 | 8/1990 | Cuschleg et al. | 379/266 |
| 4,972,461 | 11/1990 | Brown et al. | 379/67 |
| 5,001,710 | 3/1991 | Gawrys et al. | 370/110.1 |
| 5,017,917 | 5/1991 | Fisher et al. | 340/825.79 |
| 5,036,535 | 7/1991 | Gechter et al. | 379/210 |
| 5,164,983 | 11/1992 | Brown et al. | 379/265 |
| 5,256,863 | 10/1993 | Ferguson et al. | 235/383 |
| 5,261,096 | 11/1993 | Howarth | 395/650 |
| 5,278,977 | 1/1994 | Spencer et al. | 395/575 |
| 5,280,625 | 1/1994 | Howarter et al. | 395/200 |
| 5,343,477 | 8/1994 | Yamada | 371/8.2 |
| 5,392,400 | 2/1995 | Berkowitz | 395/200 |
| 5,428,608 | 6/1995 | Freeman et al. | 379/93 |
| 5,444,774 | 8/1995 | Friedes | 379/266 |
| 5,455,903 | 10/1995 | Jolissaint et al. | 395/155 |
| 5,528,678 | 6/1996 | Kaplan | 379/265 |
| 5,530,744 | 6/1996 | Charalambous | 379/265 |
| 5,572,643 | 11/1996 | Judson | 395/793 |
| 5,610,910 | 3/1997 | Focsaneanu et al. | 379/94 |
| 5,619,557 | 4/1997 | Van Berkum | 379/265 |
| 5,761,289 | 6/1998 | Keshav | 379/142 |
| 5,764,736 | 6/1998 | Shachar et al. | 379/93.23 |
| 5,838,682 | 11/1998 | Dekelbaum et al. | 370/401 |
| 5,884,032 | 3/1999 | Bateman et al. | 379/265 |
| 5,991,394 | 3/1999 | Dezonno et al. | 379/93.24 |

APPARATUS AND METHODS FOR COORDINATING TELEPHONE AND DATA COMMUNICATIONS

FIELD OF THE INVENTION

This invention relates to data and telephone communications, and particularly to coordinating data and telephone communications so that they can be routed to desired places.

BACKGROUND OF THE INVENTION

Computer technology has improved drastically in the past thirty years. One of the results of the improvement is that the price of a computer having similar computation power dropped exponentially. For example, a microcomputer costing less than a thousand dollars today has more data processing power than a mainframe computer thirty years ago costing millions of dollars. Thus, computers become affordable to small companies and homes. As more and more companies and homes acquire computers, there is a desire to connect them together so as to share information. As a result, data communication technology (such as local and wide area networks) also underwent major development. The technology allows computer data to be easily transferred between computers.

One of the most exciting development in data communication is the Internet, which is a worldwide interconnection of millions of computers, from low end personal computers to high-end mainframes. The Internet grew out of work funded by the U.S. government's Advanced Research Projects Agency. For a long time, Internet was used by scientists in universities and national laboratories to share information. As the existence of the Internet became more widely known, other people (such as employees of large corporations) started to use Internet to carry electronic mails. In 1989, a wide-area information system know as the World Wide Web ("the web") was developed. The web is a wide-area hypermedia information retrieval system aimed to give universal access to a large universe of documents. At that time, the web was known to and used by the academic/research community only. There was no easily available tool which allows a technically untrained person to access the web. The most exciting development in Internet is the development of web "browsers." These browsers have a simple but powerful graphic interface that allows a user to retrieve web documents and navigate the web using simple commands and popular methods such as point-and-click. Because the user does not have to be technically trained and the browser is easy to use, it has the potential of opening up the Internet to the masses.

Internet can also be used as a communication medium for users to purchase services and products. In this application, "merchants" display product and ordering information as web documents. Customers can review the documents and place orders by clicking on (i.e., selecting) appropriate places on the documents. Information about an order (e.g., model number and quantity) and its associated customer (e.g., name and shipping address) may be transmitted electronically. It is anticipated that this form of electronic commercial transaction will grow in importance as more and more homes install computers and gain access to the Internet.

Another technology that is gaining in popularity by the reduced costs of computers is the development of telephone call centers. In a call center, a large number of agents handle telephone communication with customers. The matching of calls between customers and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database server to obtain information about the customer who has been assigned that phone number. The software can now route the call to an agent who can best handle the call based on predefined criteria (e.g., language skill, knowledge of products the customer bought, etc.). The software immediately transfers relevant information to a computer screen used by the agent. Thus, the agent can gain valuable information about the customer prior to receiving the call. As a result, the agent can more effectively handle the telephone transaction.

As the price of computers decreases, the equipment costs of implementing a call center also decrease. Consequently, it is affordable for the "merchants" in electronic commerce to operate call centers.

It is desirable to coordinate Internet communication of computer data with call center routing of telephone calls. For example, a customer using Internet to conduct electronic commerce may not wish to transmit his/her credit card information electronically because of security risks in the Internet. Thus, the customer may wish to orally give the credit card information to an agent of the "merchant." As another example, the customer may wish to ask an agent additional information about a product while viewing a web document describing the product. If the agent can have access to the web documents seen by the customer prior to receiving the call, the quality and efficiency of services provided by the agent can be improved tremendously.

Even though both the data communication technology and call center technology are useful for business applications, coordinating data communication and telephone communications has been difficult. One of the reasons is that these two technologies follow different protocols and products designed for one technology cannot be communicate with products designed for the other technology.

SUMMARY OF THE INVENTION

The present invention involves methods and systems for coordinating telephone and data communication between different sites. In a first embodiment of the present invention, a first site has at least a computer and a telephone. The computer in the first site displays information (e.g., web pages) originated from a server. A second site has a plurality of agents each associated with a computer and a telephone. The second site also has a telephone switch for directing incoming phone calls to these agents. The computer in the first site sends to the server, via a communication network, such as the Internet, information identifying the first site and a request indicating an intention to call the second site. The request and the identification information are delivered to a software module in the second site. Based on this identification information, the second site can retrieve information on the first site (which has previously been stored in a database in the second site). An agent who is able to respond to a call from the first site is selected. A telephone number of a routing point of the telephone switch is reserved for this phone call, and the telephone number is sent to the first site via the digital communication network. When the switch receives an incoming call having this telephone number, this incoming call is routed to a telephone associated with the selected agent. The digital information originated from the server and the retrieved information of the first site are delivered to a computer associated with the selected agent. As a result, the agent can obtain information about the first site (i.e., the caller) and immediately display the same information already displayed on the computer in the first site.

In another embodiment of the present invention, the telephone call is initiated by the second site (whereas the above first embodiment involves a telephone call initiated by the first site). The computer in the first site sends to the server, via the communication network, a request to the second site indicating a desire to receive a phone call from the second site. The request includes information related to a telephone number associated with the telephone in the first site. This telephone number is stored in a file in the second site. The file also contains other outbound telephone numbers. The second site contains a device that can dial the telephone numbers stored in the file and monitor the status of telephone lines carrying the dialed telephone numbers. After the telephone number corresponding to the telephone in the first site is dialed and upon determining it is able to receive the phone call (i.e., the line is not busy), an agent who is able to handle the phone call is selected. Information about the first site (which has previously been stored in the second site) is retrieved. The retrieved information on the first site and the information originated from the server are delivered to a computer associated with the selected agent. As a result, the agent can obtain information about the first site and immediately display the same information already displayed on the computer in the first site.

These and other features of the present invention will become apparent from the following description when read in conjunction with the accompanying drawings.

DETAILED DESCRIPTION OF THE INVENTION

The present invention comprises a novel system and related methods for coordinating telephone and data communications. The following description is presented to enable any person skilled in the art to make and use the invention. Description of specific applications is provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
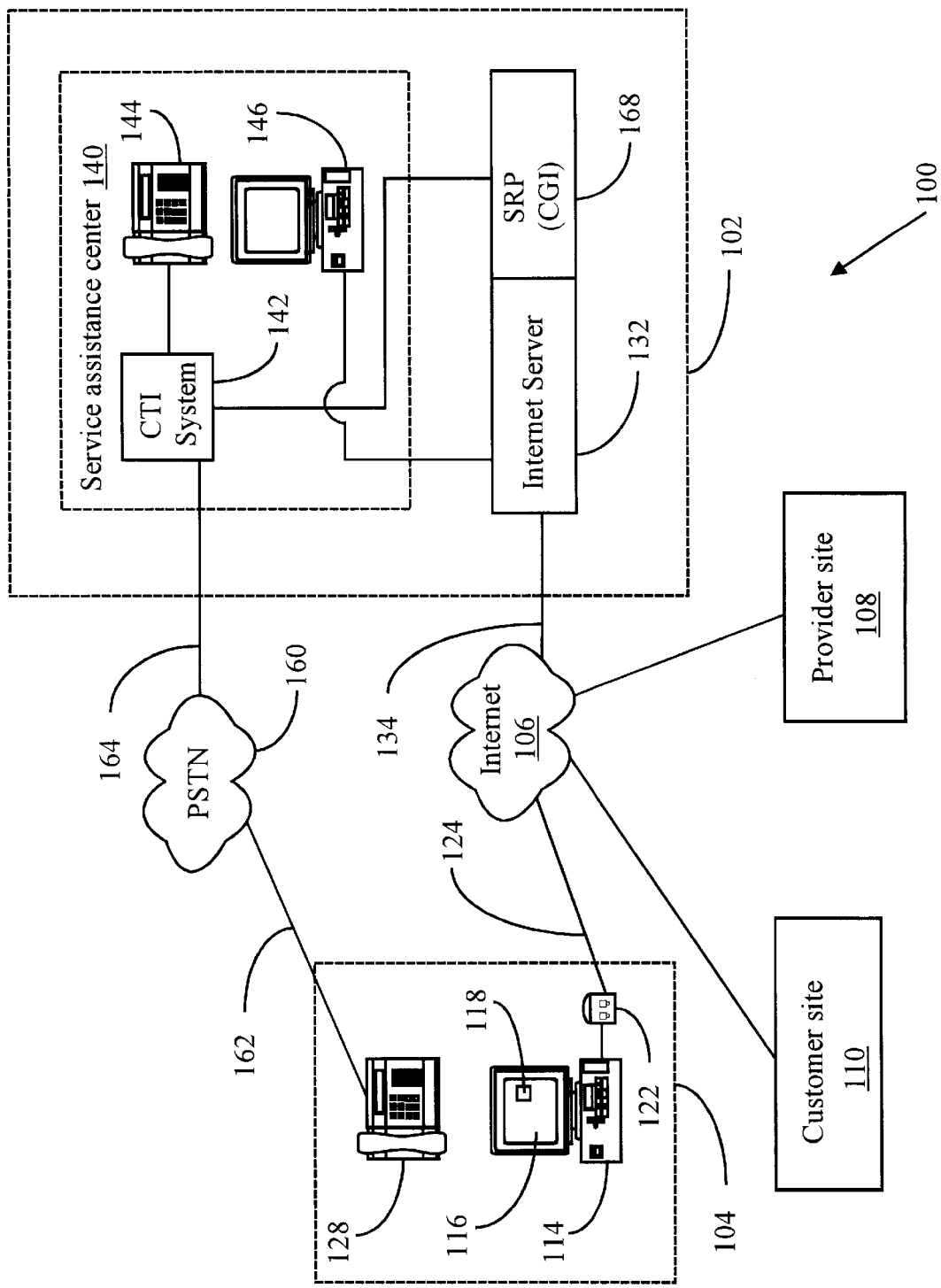
FIG. 1 is a block diagram of a voice and data communication system of the present invention.

FIG. 1 is a block diagram showing a voice/data communication system 100 operating in accordance with the present invention. System 100 comprises a provider site 102 and a customer site 104 connected by a data communication network 106, such as the Internet. It should be appreciated that the Internet is used here as an exemplary data communication network, and the present invention is not limited to be used in Internet. In this embodiment, provider site 102 and customer site 104 are engaged in electronic commercial transactions. Thus, provider site 102 sends (via Internet 106) product information, order forms, confirmation notices, etc. to customer site 104 and customer site 104 sends in (again via Internet 106) orders, shipping address, and payment information, etc. to provider site 102. In this system, provider site refers generally to a location which sells information, products or services and customer site refers to a location which requests such information, products or services. A plurality of other provider sites, such as provider site 108, and a plurality of other customer sites, such as customer site 110, are also connected to Internet 106.

It should be appreciated that the present invention relates to coordinating data and telephone communications between any two sites. The description of provider sites and customer sites pertains to an important (but not the only) application of the present invention envisioned by the inventor. The present invention can be applied to many applications.

Customer site 104 comprises a client computer 114 running a browser 116 of the present invention. Client computer 114 is connected to a modem 122 which is coupled to a TCP/IP connection 124. As a result, client computer 114 is able to gain access to the Internet 106. A user in customer site 104 uses browser 116 to communicate with other computers connected to Internet 106.

Customer site 104 also contains a telephone 128 which allows the user in customer site 104 to make telephone communication with a service agent in provider site 102. Telephone 128 is coupled to a public switched telephone network (PSTN) 160 via a telephone channel 162. In the prior art system, it is not possible for the system to coordinate voice (via PSTN 160) and data (via Internet 106) communication between the user and the service agent. One aspect of the present invention allows such coordination to take place. As a result, the user and the service agent can display the same data (e.g., the same web page) at their respective computer screens and communicate orally (or visually if picture-phones are installed in both sites) at the same time.

Provider site 102 comprises a server 132 connected to Internet 106 through a TCP/IP connection 134. Server 132 supplies various web documents (e.g., product information, order forms, etc.) to browsers that request the documents. Provider site 102 contains a service assistance center 140 in which a number of service agents can take telephone calls from users in various customer sites. Service assistance center 140 contains a computer-telephony-integration (CTI) system 142 for accepting calls from PSTN 160 and routing calls to a plurality of telephones, one of them is shown as telephone 144. Service assistance center 140 also contains a plurality of computers, one of them is shown as computer 146. CTI system 142 is coupled to PSTN 160 via a high bandwidth telephone channel 164, such as a primary rate interface (PRI) as defined in the CCITT ISDN 1.431 standard. The service agents use both the computers and telephones to efficiently provide services to various users in the customer sites.

It should be appreciated that the CTI system 142 is not limited to route voice communication. It can also route other types of communication. A CTI system that can route video calls has been disclosed in a copending patent application entitled "Video Telecommunication Routing Systems and Methods" filed Oct. 25, 1995 in the names of Alec Miloslavsky and Jason Goecke. This copending patent application Ser. No. 08/548,178, is hereby incorporated by reference. It should also be appreciated that service assistance center 140 and provider site 102 can be in different physical locations, as long as they are electronically connected in the manner described below.

The Internet side of the invention is first described. Browser 116 is a piece of software that can display information sent by server 132. A protocol for communication between customer site 104 and provider site 102 using Internet 106 is the HTTP or web protocol. One of the advantages of web protocol is that the display on browser 116 is a graphic document (commonly called a web page) containing text, images, and other information. Each web page has an address in a recognized format—the URL, or Uniform Resource Locator—that enables computers all over the world to access it. Browser 116 sends a request to the URL of a web page in server 132. Server 132 responds with a file encoded in a special language called the hypertext markup language (HTML). This language contains "tags" which allows a programmer to specify the appearance of the web page and set up hyperlinks to other HTML documents (located in the same or other servers). As a result, the user in customer site 104 is able to use browser 116 to access information in server 132.

The web protocol also contains various mechanisms, e.g., common-gateway-interface (CGI), POST and GET methods, etc., for browser 116 and server 132 to communicate with each other. As a result, it is possible to design a system for the user in customer site 104 to place orders through the web page. For example, the user can click on an icon on a web page to order a product associated with the icon. Server 132 receives and processes the order. This is one of the methods for carrying out electronic commercial transactions.

When the user in customer site 104 is reviewing information on browser 116 or is about to place an order, the user may request the attention of a service agent in service assistance center 140. For example, the user may want to ask additional information or provide confidential information (such as a credit card number) orally to the service agent. It is desirable for the service agent to display by his/her computer 146 the same web page displayed on browser 116 while interaction with the user through telephone. It is also desirable for the service agent to obtain as much information about customer site 104 as possible prior to commencing telephone communication with the user.

In the prior art methods, the user has to look up the telephone number of the service assistance center and manually call the center. After connected to a service agent, the user has to explain his/her needs, and if necessary, describe to the agent the web page being displayed on the browser. The service agent needs to identify the user and may have to access the server to find the web page displayed on the user's computer. It can be seen that this method is very slow and ties up valuable time of a service agent. As a result, prior art service assistance centers require many service agents in order to provide adequate service to customers.

One aspect of the present invention provides automatic coordination between the telephone communication and the Internet communication. As an example, when the telephone communication is established, the web page displayed by browser 116 is automatically displayed on computer 146 together with information about customer site 104. As a result, the service agent may anticipate the user's needs and immediately provide desired services to the user. It should be appreciated that telephone communication in the present system includes voice and/or video communication through PSTN 160.

In the present invention, the web page originated from server 132 contains an icon, such as a button 118, positioned at a convenient location of the web page. This icon is displayed by browser 116. When the user wishes to initiate telephone communication with service assistance center 140, he/she can click on (i.e., select) button 118. There is no need for the user to look up the telephone number of service assistance center 140. One way for browser 116 to display a clickable button 118 is by embedding (at the appropriate place in the associated HTML document) a tag of the form: <A HREF="phone.html"><IMG src="HTTP:// "button.gif"></A>. In this example, "button.gif" is the URL address of a graphic file (in a popular graphic format called GIF) associated with the button icon and "phone.html" is the URL address of a file which can respond to the clicking. This tag tells a browser to display the "button" image (which is preferably stored in server 132), and to treat it as a clickable item that, whenever a user clicks on it with a mouse, triggers a connection to the file "phone.html" (also preferably stored in server 132).

When button 118 is clicked, browser 116 sends a telephone service request to "phone.html" in server 132. Server 132 then sends the request and associated data (e.g., the identity of customer site 104 and the HTML document associated with the web page displayed on browser 116) to a service request process (SRP) 168. SRP 168 is a software module which could run on server 132 or on a separate data processing device. SRP 168 selects an available service agent in accordance with predetermined criteria (e.g., availability of agents, previous interaction between a certain agent and customer site 104). Assuming that the service agent associated with computer 146 is selected, the HTML document previously sent to customer site 104 is delivered to computer 146. Computer 146 contains a browser and can display the HTML document. As a result, the service agent who will interact with the user in customer site 104 is able to see the same web page the user is seeing. As explained below, other information about customer site 104 can also be sent to computer 146. This information is accessible by the service agent.

Figure 2:
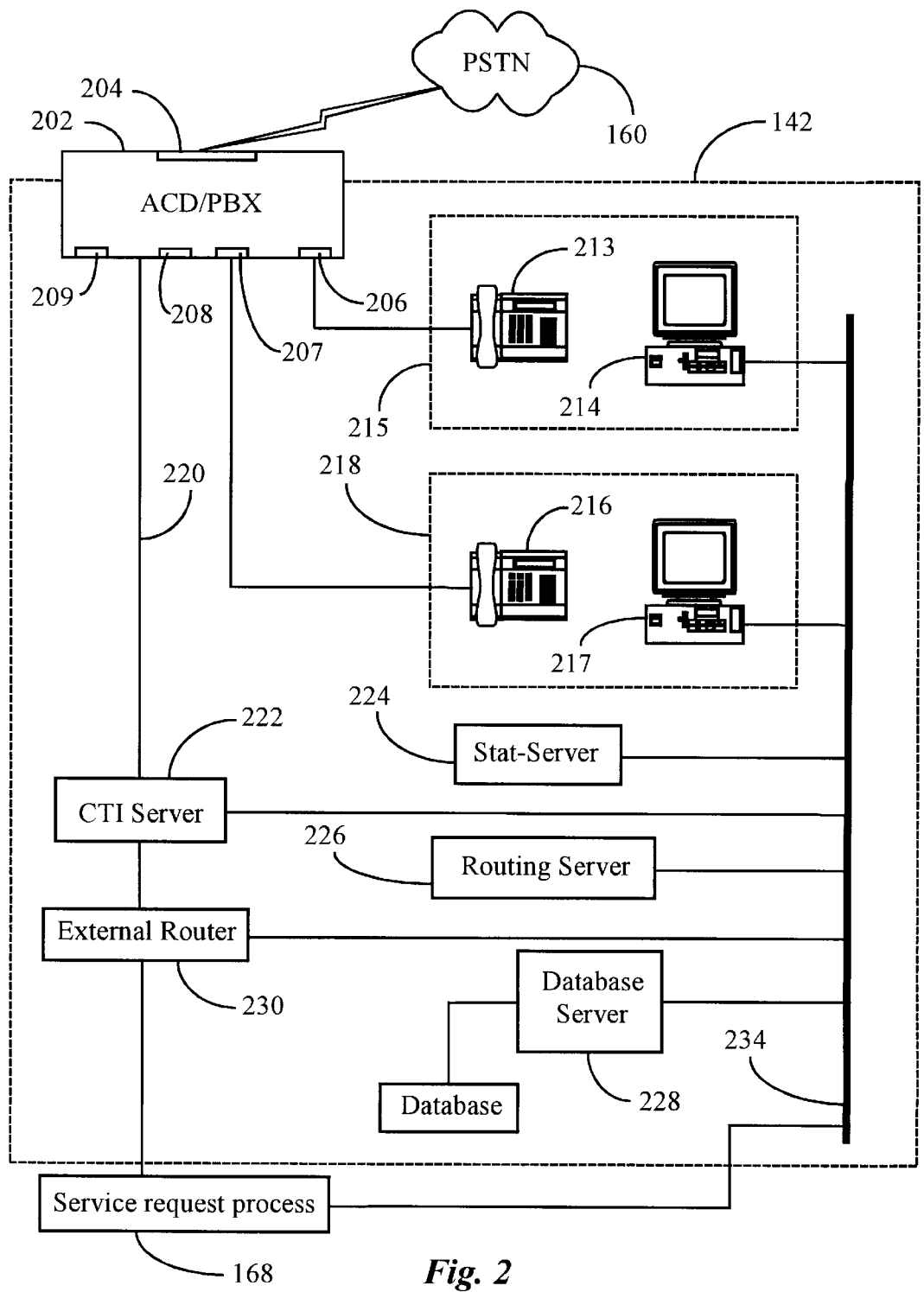
FIG. 2 is a block diagram of a computer-telephony-integration system of the present invention.

One aspect of the present invention is a CTI system that can provide a telephone connection between the user and the service agent associated with computer 146. FIG. 2 shows a block diagram of CTI system 142 which works with SRP 168 to provide such a connection. Reference numerals in FIG. 2 that are the same as that for FIG. 1 refer to the same elements.

CTI system 142 comprises a switching device 202 for accepting calls from PSTN 160. Examples of switching device 202 are (but not limited to) an automatic call distributor (ACD)/private branch exchange (PBX) and a PSTN switch. It should be appreciated that switching device 202 (hereinafter "PBX 202") can be a customer premise equipment or may be provided by a telephone communication carrier. PBX 202 contains a high bandwidth port 204 (for connecting to PSTN 104) and a plurality of low bandwidth ports (such as ports 206–209). Each of the low bandwidth ports is assigned one or more directory numbers. Some of these ports can be connected to telephones used by service agents (such as telephones 213 and 216).

In order to facilitate the operation of service agents, each agent has easy access to a telephone and a computer. In FIG.

2, a telephone and a computer is set up as a station and assigned to a service agent. For example, telephone 213 and a computer 214 is grouped as a station 215 while telephone 216 and a computer 217 is grouped as a station 218. When a service agent logs in, he/she can enter his/her identification information to computers 214 and 217, respectively. As explained above, information on the service agents (such as language skill, knowledge of products, etc.) could be used by SRP 168 as some of the factors in selecting an appropriate service agent to interact with a particular user.

PBX 202 is connected to a CTI server 222 through a CTI link 220. CTI system 142 also comprises a stat-server 224 and a routing server 226. Stat-server 224 stores all relevant activities of CTI system 142 (e.g., the current status and history of activities of all low bandwidth ports). Routing server 226 routes calls to appropriate low bandwidth ports based on factors such as the information contained in stat-server 224, the information delivered by PBX 202 and the status of various low bandwidth ports. CTI system 142 contains a database server 228 containing information of provider site 102, e.g., agent skills, and information pertaining to the customers of provider site 102, including information of customer site 104. CTI system 142 also contains an external router 230, working together with SRP 168, for reserving a specific telephone channel between customer site 104 and the telephone in the station of the selected service agent. The detail operation of external router 230 will be described below.

One function of CTI server 222 is to act as a bridge between PBX 202 at one end and stat-server 224, external router 230 and routing server 226 at the other end. CTI server 222 is designed to interface with PBXs manufactured by different vendors and present a uniform application program interface (API) to stat-server 224, external router 230 and routing server 226. An advantage of this arrangement is that individual components in CTI system 142 could be replaced and enhanced separately. For example, substantially the same routing server, external router and stat-server could be used with PBXs from different manufacturers (e.g., AT&T, Northern Telecom or Ericsson) by changing CTI server 222. Specifically, different versions of a particular implementation of CTI server 222 can be designed to match with switches made by different manufacturers (provided that the switches have a CTI link). These versions communicate with the same routing server, external router and stat-server through a standard protocol which is switch-independent.

In one embodiment of the present invention, stat-server 224, external router 230, routing server 226, external router 230, and computers 214 and 217 are connected to a communication network 234. In the present embodiment, the function of these servers and external router 230 are provided by software modules running in one or more computers. It should be appreciated that even though CTI server 222, routing server 226, stat-server 224, external router 230 and database server 228 are shown as separate components, they could be combined into one, two, three or four components residing on one or more data processing devices.

SRP 168 is connected to external router 230 and communication network 234. After a user in customer site 104 clicks on button 118 and issues a request, SRP 168 determines the status of the agent computers (e.g., whether computers 214 and 217 have been turned on) and the identity of agents in the stations. SRP 168 may need to access database server 228 and stat-server 224 to obtain the necessary information. SRP 168 then selects an appropriate agent and notifies external router 230. External router 230 selects a telephone number of a routing point of PBX 202 and associate this telephone number with the directory number of PBX 202 which connects to the telephone of the selected service agent. The routing point is a component in PBX 202 which generates a CTI redirect request to CTI server 222 whenever a call reaches this component. This routing point could be a control directory number, virtual directory number, or a trunk/dial number identification system (DNIS). The exact nature of the telephone number is not important, as long as it is a number which can reach the routing point. Thus, the telephone number could be a private network number, a public network number or an international number.

External router 230 notifies CTI server 222 and SRP 168 of this telephone number. SRP 168 causes server 132 to send this telephone number to browser 116 in customer site 104. Browser 116 can either display this number so that the user can dial it manually or dial the number electronically and notifies the user about the status of the telephone connection. When PBX 202 receives a call having this telephone number, it directs the call to CTI server 222. CTI server 222 sends the call to external router 230, which then delivers this call to the directory number associated with the selected service agent.

PBX 202 keeps a number of such routing points specifically reserved to accommodate requests from SRP 168. These routing points are used as "semaphores" by SRP 168. They are allocated and deallocated as needed. Once a routing point is reserved by SRP 168 for a particular service agent, it is considered unavailable. Once the call is routed to the service agent, the routing point is again usable.

Figure 3:
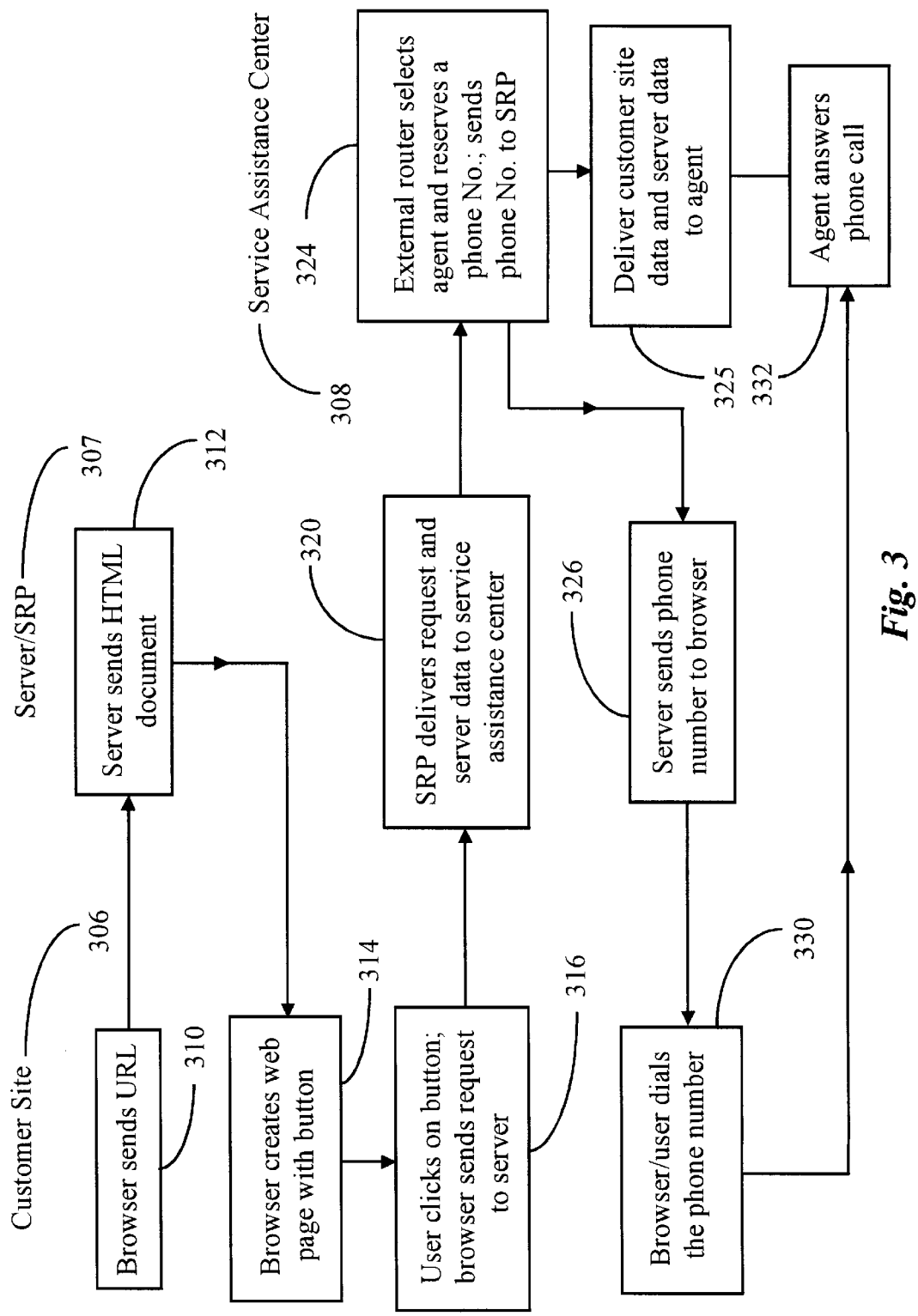
FIG. 3 is a flow diagram showing the flow of events during an exemplary data and voice communication session conducted in accordance with the present invention.

FIG. 3 is a flow diagram showing the flow of events during an exemplary data and voice communication session using the CTI system shown in FIG. 2. In FIG. 3, operations are grouped under three columns 306–308 indicating the locations in which the operations take place: customer site, server/SRP and service assistance center. When a session starts, browser 116 in customer site 104 sends a URL to server 132 (operation 310). Server 132 responds by sending browser 116 a HTML document (operation 312). This document contains a tag causing browser 116 to display a clickable button. Browser 116 receives the HTML document and creates a web page based on the HTML document (operation 314). After reviewing the displayed web page, the user clicks on button 118. Browser 116 responses by sending a request for an agent (together with data identifying customer site 104, if needed) to server 132 (operation 316). Server 132 delivers the request and the data to SRP 168, which in turn delivers the information to external router 230 (operation 320). External router 230 selects a service agent. It reserves a telephone number and associates it with a telephone used by the selected service agent. This telephone number is sent to SRP 168 (operation 324). At this time, the service agent receives information regarding customer site 104 and the HTML documents previously sent to browser 116 (operation 325). The telephone number received by SRP 168 is sent to server 132, which in turn sends the number to browser 116 (operation 326). Browser 116 (or the user) then dials the telephone number so as to establish telephone connection to the selected service agent (operation 330). As pointed out above, this telephone number causes PBX 202 to route the call to the directory number associated with the selected service agent. The service agent receives the telephone call (operation 332). At this time, the service agent has already acquired a lot of information about customer site 104 and the web pages previously delivered thereto.

Another embodiment of the present invention is now described. In this embodiment, call center 102 initiates the telephone call (in response to a request by a user in customer site 104) instead of customer site 104 initiates the telephone call. Referring now to FIG. 1, the user requests a telephone call by clicking on button 118 (which could be labeled a "call me" button). A dialog box appears. It asked the user to enter the telephone number of phone 128. Browser 116 then sends the telephone number of phone 128 to server 132 in provider site 102. Alternatively, the telephone number could have been previously stored in computer 114 (e.g., in the form of a persistent client state information commonly called the "cookies" in Internet technical literature). Server 132 then sends the telephone number and associated data (e.g., the identity of customer site 104 and the HTML document associated with the web page displayed on browser 116) to SRP 168. SRP 168 then requests service assistance center 140 to call this telephone number and select an agent to talk with the user.

Browser 116 could send other identification information instead of the telephone number to server 132. For example, the name or Internet address of customer site 104 could be sent. Server 132 or SRP 168 could maintain a customer list associating the identification information with the telephone number of phone 128. As a result, service assistance center 140 could call telephone 128 based on information on this customer list.

Other information can also be sent by browser 116. For example, the user can specify a certain time period on a certain date as an appropriate time for receiving calls from service assistance center 140.

Figure 4:
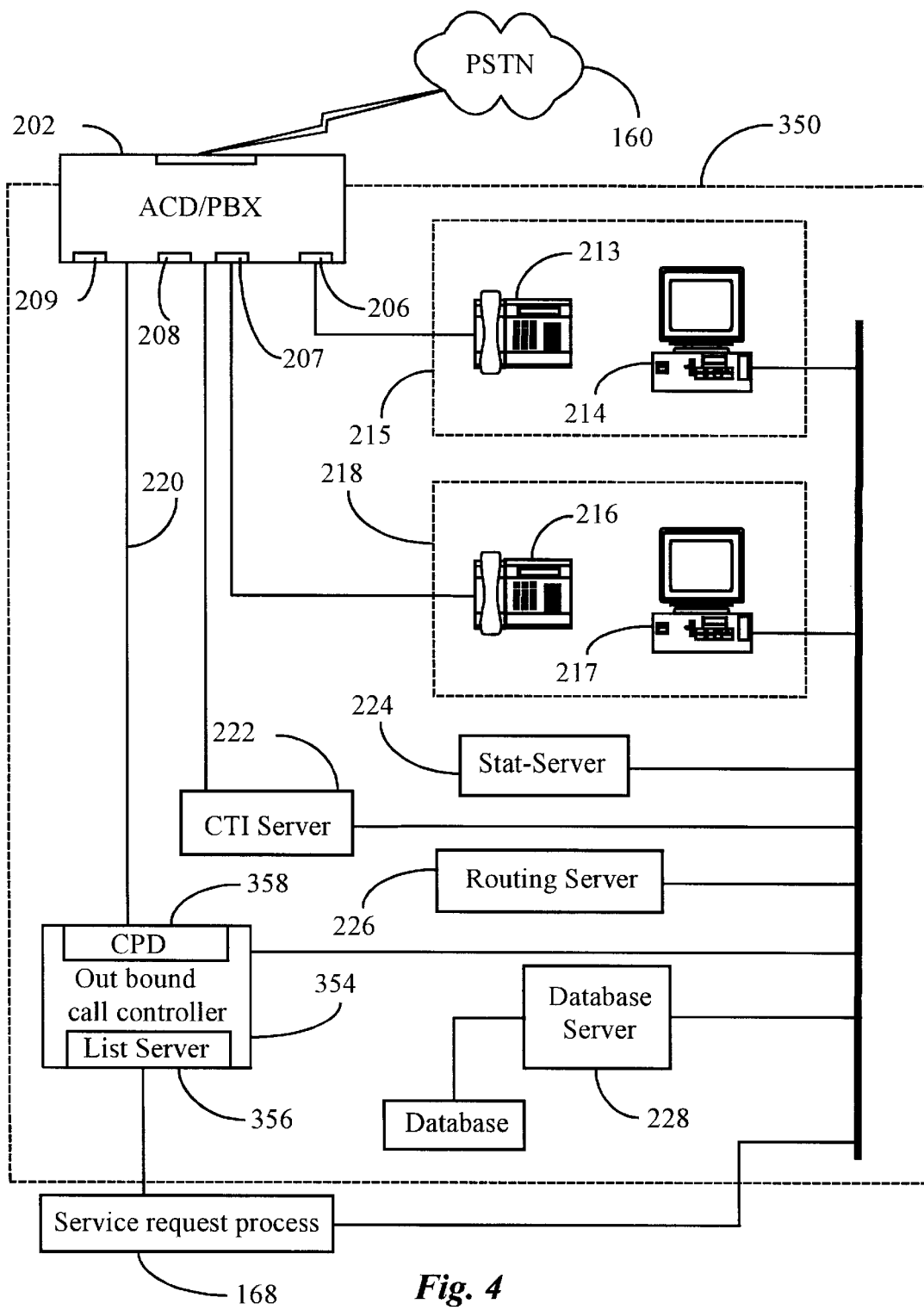
FIG. 4 is a block diagram of another computer-telephony-integration system of the present invention.

FIG. 4 is a block diagram of a CTI system 350 which can call telephone 128 in accordance with the present invention. Reference numerals in FIGS. 2 and 4 that are the same refer to the same elements. It should be appreciated that a CTI system can be formed by combining elements in FIGS. 2 and 4 so as to allow either provider site 102 or telephone 128 to initiate the telephone call.

In FIG. 4, SRP 168 is connected to an outbound call controller 354, which is in turn connected to switching device 202 and communication network 234. After SRP 168 receives the telephone number of phone 128, it deposits the number in a list server 356. This server is essentially a queue which contains all the telephones which needs to be dialed out by service assistance center 140. Typically, the queue is arranged in a first-in-first-out manner. However, it is possible to set up a different priority scheme for scheduling the calls.

Outbound call controller 354 dials the telephone numbers in list server 356. The progress of the call is monitored by a call progression detector (CPD) 358. Detector 358 returns the status of the call (e.g., line busy, call received by a facsimile machine, call received by a modem, etc.). Outbound call controller 354 takes appropriate actions based on this status, e.g., it can dial another number in list server 356 if the telephone corresponding to a previously dialed number is busy.

When the telephone number corresponding to phone 128 is dialed and CPD 358 determines that the line is not busy, outbound call controller 354 requests routing server 226 to find a free agent who is qualified to handle the call to customer site 104. SRP 168 can then send the digital data (e.g, the HTML document displayed on the user's computer) to the selected agent. As a result, an agent in service assistance center 140 is able to talk with a user in customer site 104 while reviewing the web page displayed on browser 116 in customer site 104.

In a different version of this embodiment, SRP 168 can estimate the length of time for service assistance center 140 to call telephone 128 based on the number of telephone numbers already in list server 356 and the availability of agents. If this length of time is excessively long, SRP 168 may ask Internet server 132 to send a message to browser 116 informing the user of the estimated waiting time. The user has the freedom to request a rescheduling of the call.

Figure 5:
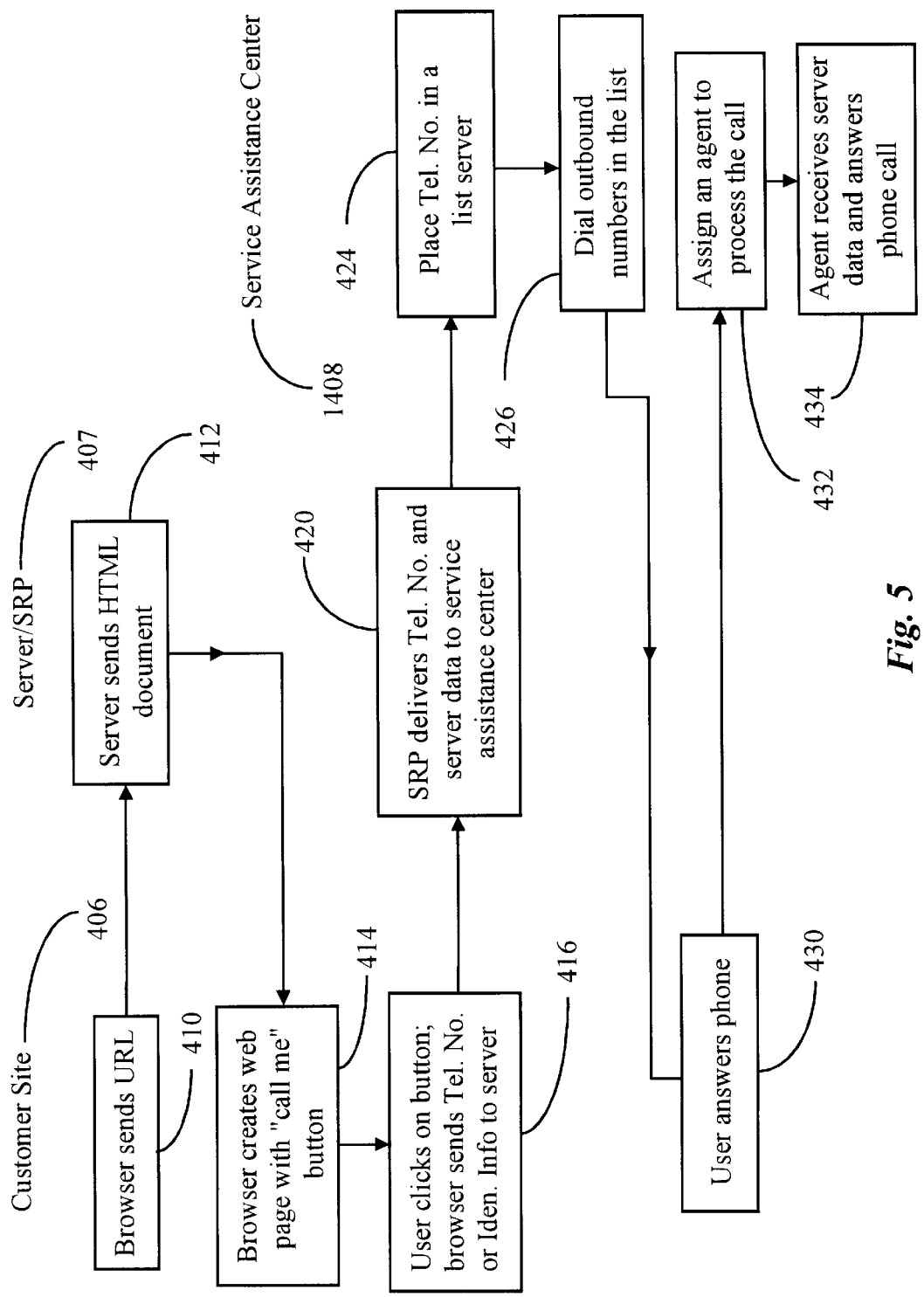
FIG. 5 is a flow diagram showing the flow of events during another exemplary data and voice communication session conducted in accordance with the present invention.

FIG. 5 is a flow diagram showing the flow of events during an exemplary data and voice communication session using the CTI system shown in FIG. 4. In FIG. 5, operations are grouped under three columns 406–408 (similar to that of FIG. 3) indicating the locations in which the operations take place: customer site, server/SRP and service assistance center. When a session starts, browser 116 in customer site 104 sends a URL to server 132 (operation 410). Server 132 responds by sending browser 116 a HTML document (operation 412). This document contains a tag causing browser 116 to display a clickable button. Browser 116 receives the HTML document and creates a web page based on the HTML document (operation 414). After reviewing the displayed web page, the user clicks on "call me" button 118. Browser 116 responses by sending a request for a phone call, together with telephone number and/or data identifying customer site 104, to server 132 (operation 416). Server 132 delivers the request and the telephone number to SRP 168, which in turn delivers the number to outbound call controller 354 (operation 420). The telephone number is placed in list server 354 (operation 424). Controller 354 dials outbound phone calls from number is list server 354 (operation 426). When the user in customer site 104 answers the call (operation 430), an agent in service assistance center 102 is assigned to handle the call (operation 432). Data related to customer site 104 and the web page viewed by the user is delivered to the agent. The agent can then answer the call with all necessary information on hand (operation 434).

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

What is claimed is:

1. A system for conducting multimedia communication between an agent at a call center and a customer, comprising:

a customer location having a telephone connected by a first telephone line to a telephone network, and a computer connected by a data modem via a second telephone line to a wide area network (WAN);

a presentation server connected to the wide area network (WAN) and adapted for data connection to the computer at the customer location via the second telephone line and the data modem, whereby a customer may interact with a presentation provided by the presentation server; and a Computer Telephony Integration (CTI)-enhanced call center having a telephony switch connected to a CTI server executing CTI applications and connected to a telephony trunk, the CTI server also connected also by a digital data link to the presentation server, and the telephony switch connected to telephones in plural agent stations at the call center, the plural agent stations also having computer stations with video display units (PC/VDU);

wherein a customer-initiated interaction with the presentation causes the presentation server to request, via the digital data link to the CTI server, a voice telephony connection between one of the agent stations and the first telephone line at the customer location, and wherein the CTI server in response to the request returns a telephone number of a routing point at the CTI enhanced call center to the presentation server via the digital data link, the presentation server provides the routing point number to the customer in the presentation, selects an agent station for the connection, informs the presentation server of the agent station selection, the CTI server routes an incoming call placed by the customer on the second telephone line to the routing point to the selected agent station, and the presentation server connects the presentation to the selected agent station.

2. The system of claim 1 wherein the PC/VDUs at agent stations are connected to a local area network (LAN) with a file server having customer information also connected on the LAN, and wherein the CTI server, based on data from the presentation server identifying the customer, retrieves data regarding the customer from the file server and causes the data regarding the customer to be displayed at the PC/VDU at the agent station when the call is accomplished between the customer and the agent station.

3. The system of claim 1 wherein the wide area network is the Internet, the server is a WEB server connected to the Internet, and the presentation is a WEB page hosted by the WEB server.

4. A Computer Telephony Integration (CTI)-enhanced call center comprising:

a telephony switch connected to a telephony trunk and to telephones at plural agent stations, the plural agent stations also having computer platforms with video display units (PC/VDU); and a CTI server connected by a CTI link to the telephony switch and having a data link to an Internet server;

wherein, upon receiving a request from the Internet server, the CTI server selects an agent to interact with a customer connected to the Internet server and viewing a presentation from the Internet server, returns a telephone number of a routing point at the computerized telephony switching system via the data link to the Internet server for relay in the presentation to the customer, and then routes a telephony call arriving at the routing point from the customer to the selected agent, and receives the presentation from the Internet server via the data link, and provides the presentation to the PCIVDU at the selected agent station.

5. In a system comprising a presentation server connected to a wide area network (WAN) and adapted to present a hosted interactive presentation to a customer also connected to the wide area network, a method for providing a voice telephony connection separate from the wide area network between the customer and an agent, and for coordinating the voice connection with transmission of the presentation to the agent, the method comprising steps of:

(a) upon an input to the interactive presentation by the customer, requesting the voice connection be established, the request sent via a data link from the presentation server to a CTI server at a CTI-enhanced call center, the CTI server connected to a telephony switch having a trunk line and plural agent stations each with a telephone connected to the telephony switch;

(b) selecting one of the plural agent stations to interface with the customer on the voice connection;

(c) establishing the voice connection with the customer via the trunk by returning a telephone number of a routing point at the telephony switch to the presentation server for transfer via the WAN to the customer;

(d) receiving at the routing point a telephony call from the customer, switching the established call to the selected agent; and (e) transmitting the presentation via the data link to a computer at the selected agent station.

* * * * *